United States Patent [19]
Fletcher et al.

[11] Patent Number: 5,470,671
[45] Date of Patent: Nov. 28, 1995

[54] ELECTROCHEMICAL FUEL CELL EMPLOYING AMBIENT AIR AS THE OXIDANT AND COOLANT

[75] Inventors: Nicholas J. Fletcher; Gordon J. Lamont, both of Vancouver; Vesna Basura, Burnaby; Henry H. Voss, West Vancouver; David P. Wilkinson, North Vancouver, all of Canada

[73] Assignee: Ballard Power Systems Inc., North Vancouver, Canada

[21] Appl. No.: 171,732

[22] Filed: Dec. 22, 1993

[51] Int. Cl.[6] .................................................. H01M 8/02
[52] U.S. Cl. .............................. 429/26; 429/30; 429/34; 429/35; 429/40; 429/41
[58] Field of Search ............................... 429/26, 30, 34, 429/35, 38, 40, 41

[56] References Cited

U.S. PATENT DOCUMENTS

| | | |
|---|---|---|
| 668,838 | 2/1901 | de Lavison . |
| 3,507,702 | 4/1970 | Sanderson . |
| 4,414,291 | 11/1983 | Breault . |
| 4,988,583 | 1/1991 | Watkins et al. ........................ 429/30 |
| 5,108,849 | 4/1992 | Watkins et al. . |
| 5,190,834 | 3/1993 | Kendall . |
| 5,242,764 | 9/1993 | Dhar ........................................ 429/30 |
| 5,284,718 | 2/1994 | Chow et al. ............................ 429/26 |
| 5,300,370 | 4/1994 | Washington et al. .................. 429/34 |

Primary Examiner—Prince Willis, Jr.
Assistant Examiner—M. Nuzzolillo
Attorney, Agent, or Firm—McAndrews, Held & Malloy, Ltd.

[57] ABSTRACT

An electrochemical fuel cell assembly includes a membrane electrode assembly which comprises an anode, a cathode having a surface thereof exposed to ambient air, and an ion exchange membrane interposed between the anode and the cathode. A seal forms a gas-impermeable barrier around the anode to which a gaseous fuel stream is supplied. The assembly further includes a thermally conductive plate having a plurality of thermally conductive members or fins extending from a major surface of the plate. The thermally conductive members contact portions of the exposed cathode surface. Adjacent thermally conductive members cooperate with the plate and the exposed cathode surface to form air conducting channels. Heat generated exothermically in the membrane electrode assembly is dissipated to the atmosphere through the thermally conductive members.

30 Claims, 8 Drawing Sheets

ELECTROCHEMICAL FUEL CELL EMPLOYING AMBIENT AIR AS THE OXIDANT AND COOLANT

FIELD OF THE INVENTION

This invention relates generally to electrochemical fuel cells and, more particularly, to a fuel cell which employs ambient air as both an oxidant and a coolant.

BACKGROUND OF THE INVENTION

A fuel cell is a device which generates electrical energy by converting chemical energy directly into electrical energy by oxidation of fuel supplied to the cell. Fuel cells are advantageous because they convert chemical energy directly to electrical energy without the necessity of undergoing any intermediate steps, for example, combustion of a hydrocarbon or carbonaceous fuel as takes place in a thermal power station.

A typical fuel cell includes an anode, a cathode and an electrolyte. Fuel and oxidant are supplied to the anode and cathode, respectively. At the anode, the fuel permeates the electrode material and reacts with an anode catalyst layer to form cations (protons) and electrons. The cations migrate through the electrolyte to the cathode. At the cathode, the oxygen-containing gas supply reacts with a cathode catalyst layer to form anions. The electrons produced at the anode travel from the fuel cell anode, through an external load, and back into the cathode of the cell. The anions produced at the cathode react with the cations and electrons to form a reaction product which is removed from the cell.

In electrochemical fuel cells employing hydrogen as the fuel and oxygen-containing air (or pure oxygen) as the oxidant, a catalyzed reaction at the anode produces hydrogen cations from the fuel supply. This type of fuel cell is advantageous because the only reaction product is water. An ion exchange membrane facilitates the migration of hydrogen cations from the anode to the cathode. In addition to conducting hydrogen cations, the membrane isolates the hydrogen fuel stream from the oxidant stream comprising oxygen containing air. At the cathode, oxygen reacts at the catalyst layer to form anions. The anions formed at the cathode react with the hydrogen ions that have crossed the membrane to form liquid water as the reaction product. The anode and cathode reactions in such fuel cells is shown in the following equations:

Anode reaction:

Cathode reaction:

A type of fuel cell known as a solid polymer fuel cell ("SPFC") contains a membrane electrode assembly ("MEA") consisting of a solid polymer electrolyte or ion exchange membrane disposed between two electrodes formed of porous, electrically conductive sheet material. The electrodes are typically formed of carbon fiber paper ("CFP"), and are generally impregnated or coated with a hydrophobic polymer, such as polytetrafluoroethylene. The MEA contains a layer of catalyst at each membrane/electrode interface to induce the desired electrochemical reaction. A finely divided platinum catalyst is typically employed. The MEA is in turn disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and 10 the cathode on the oxidant side. The electrodes are electrically coupled to provide a path for conducting electrons between the electrodes.

In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together in series or in parallel to increase the overall power output of the assembly. In such arrangements, the cells are typically connected in series, wherein one side of a given plate serves as an anode plate for one cell and the other side of the plate is the cathode plate for the adjacent cell. Such a series connected multiple fuel cell arrangement is referred to as a fuel cell stack, and is usually held together by tie rods and end plates. The stack typically includes manifolds and inlets for directing the fuel (substantially pure hydrogen, methanol reformate or natural gas reformate) and the oxidant (substantially pure oxygen or oxygen-containing air) to the anode and cathode flow field channels. The stack also usually includes a manifold and inlet for directing the coolant fluid, typically water, to interior channels within the stack to absorb heat generated by the exothermic reaction of hydrogen and oxygen within the fuel cells. The stack also generally includes exhaust outlets and manifolds for expelling the unreacted fuel and oxidant gases, each carrying entrained water, as well as an outlet manifold for the coolant water exiting the stack.

Conventional fuel cell and stack designs have several inherent disadvantages. First, conventional designs typically employ liquid cooling systems for regulating the cells' operating temperature. Liquid cooling systems are disadvantageous because they require the incorporation of additional components to direct coolant into thermal contact with fuel cells. The power requirements to operate such additional components, such as pumps and cooling fans, represent an additional parasitic load on the system, thereby decreasing the net power derivable from the stack. Such additional components also add volume, weight, complexity and cost to fuel cell designs.

Second, conventional designs employ further parasitic devices such as pumps for the delivery of pressurized fuel and oxidant to the fuel cell. In addition to adding volume, weight, complexity and cost, these parasitic systems also reduce the overall power efficiency of the system.

Third, in conventional stack arrangements it is difficult to identify and replace defective fuel cells without disrupting the operation of the entire fuel cell stack.

The present invention is directed to circumventing one or more of the above-mentioned disadvantages. Other objects and advantages of the invention will become apparent upon reading the following detailed description and appended claims, and upon reference to the accompanying drawings.

SUMMARY OF THE INVENTION

The above and other objects are achieved by an electrochemical fuel cell assembly comprising:

(a) a membrane electrode assembly comprising a porous electrically conductive anode, a porous electrically conductive cathode having a surface thereof exposed to ambient air, and an ion exchange membrane interposed between the anode and the cathode;

(b) sealant means for forming a gas-impermeable barrier around the anode;

(c) fuel delivery means for supplying a gaseous fuel stream to the anode;

(d) electrical connection means for providing an electrical connection to the anode and to the cathode; and (e) a thermally conductive plate having a plurality of first thermally conductive members extending from a major surface of the plate, the first members contacting portions of the exposed cathode surface, adjacent ones of the first members cooperating with the plate and the exposed cathode surface to form at least one air conducting channel.

In operation, at least a portion of the heat generated exothermically in the membrane electrode assembly is dissipated to the atmosphere through the first members.

The thermally conductive plate is preferably, but not necessarily, formed as a single planar piece from which the thermally conductive members extend. Alternatively, the plate could consist of a plurality of staggered bars interconnecting the thermally conductive members, which extend from the staggered bars and contact the exposed cathode surface.

The plate and the first members are preferably formed of aluminum, and the portions of the first members which contact the cathode surface have an inert metal applied thereto. The inert metal is preferably gold applied by electroplating.

The preferred electrical connection means comprises electrical conductors disposed between the anode and the ion exchange membrane, and the electrical conductors preferably extend through the sealing means. The preferred electrical conductors are formed from gold wire.

In the preferred assembly, the plate has a thermally conductive material extending from another major surface of the plate, such that heat generated exothermically in the membrane electrode assembly is further dissipated to the atmosphere through the material. The material preferably comprises a plurality of thermally conductive members, or alternatively a thermally conductive foam. The preferred thermally conductive foam is an aluminum foam.

In the preferred assembly, the fuel delivery means comprises a fuel inlet and a fuel outlet, such that the fuel outlet directs unreacted components of the gaseous fuel stream away from the anode. The assembly can further comprise a fan for directing the ambient air onto the exposed surface of the porous electrically conductive cathode. Where the gaseous fuel stream comprises hydrogen, the assembly preferably further comprising means for accumulating water condensed on the first thermally conductive members.

A fuel cell stack incorporating the above fuel cell assemblies comprises:

1. a plurality of fuel cell assemblies as defined with components (a)–(e) above;

2. serial connection means for electrically connecting the plurality of fuel cell assemblies in an electrical series having a first assembly and a last assembly, wherein the anode of each assembly except the last assembly in the series is electrically connected to the cathode of the next adjacent assembly in the series;

3. a positive current lead electrically connected to the cathode of the first assembly in the series; and 4. a negative current lead electrically connected to the anode of the last assembly in the series.

The fuel cell stack can be formed as a multiplexed arrangement, wherein the plurality of fuel cell assemblies share a common ion exchange membrane.

The above and other objects are also achieved by an electrochemical fuel cell assembly comprising:

(aa) a bicell membrane electrode assembly comprising a first porous electrically conductive cathode having a surface thereof exposed to ambient air, a porous electrically conductive anode, a second porous electrically conductive cathode having a surface thereof exposed to ambient air, a first ion exchange membrane interposed between the first cathode and the anode, and a second ion exchange membrane interposed between the second cathode and the anode;

(bb) sealing means for forming a gas-impermeable barrier around the anode;

(cc) fuel delivery means for delivering gaseous fuel to the anode;

(dd) electrical connection means for providing an electrical connection to the anode, to the first cathode and to the second cathode;

(ee) a first thermally conductive plate having a plurality of first thermally conductive members extending from a major surface of the plate, the first members contacting portions of the exposed first cathode surface, adjacent ones of the first members cooperating with the first plate and the exposed first cathode surface to form at least one air conducting channel; and (ff) a second thermally conductive plate having a plurality of second thermally conductive members extending from a major surface thereof, the second members contacting portions of the exposed second cathode surface, adjacent ones of the second members cooperating with the second plate and the exposed second cathode surface to form at least one air conducting channel.

In operation, at least a portion of the heat generated exothermically in the bicell membrane electrode assembly is dissipated to the atmosphere through the first and second members.

The first and second members are preferably formed of aluminum, the portions of the first and second members which contact the cathode surfaces have an inert metal applied thereto. The inert metal is preferably gold applied by electroplating.

The electrical connection means preferably comprises first electrical conductors disposed between the anode and the first membrane, and second electrical conductors disposed between the anode and the second membrane, such that the first and second electrical conductors extending through the sealing means. The first and second electrical conductors are preferably formed from gold wire.

In the preferred bicell assembly, the first plate has a first thermally conductive material extending from another major surface of the first plate, and the second plate has a second thermally conductive material extending from another major surface of the second plate, such that heat generated exothermically in the bicell membrane electrode assembly is further dissipated to the atmosphere through the first and second material. The first and second material each preferably comprises a plurality of thermally conductive members, or alternatively a thermally conductive foam. The preferred thermally conductive foam is an aluminum foam.

In the preferred bicell assembly, the sealing means comprises the first and second membranes, such that the edges of the first and second membranes are bonded together to form a gas-impermeable barrier around the anode.

In the preferred bicell assembly, the fuel delivery means comprises a fuel inlet and a fuel outlet, such that the fuel outlet directs unreacted components of the gaseous fuel stream away from the anode. The preferred bicell assembly further comprises a fan for directing the ambient air onto the exposed surface of the porous electrically conductive cathode. Where the gaseous fuel stream comprises hydrogen, the bicell assembly preferably further comprising means for accumulating water condensed on the first and second thermally conductive members.

A bicell stack incorporating the above bicell assemblies comprises:

I. a plurality of fuel cell assemblies as defined with components (aa)–(ff) above;

II. serial connection means for electrically connecting the plurality of bicell assemblies in an electrical series having a first assembly and a last assembly, wherein the anode of each assembly except the last assembly in the series is electrically connected to the cathodes of the next adjacent assembly in the series;

III. a positive current lead electrically connected to the cathodes of the first assembly in the series; and IV. a negative current lead electrically connected to the anode of the last assembly in the series.

The bicell stack can be formed as a multiplexed arrangement, wherein the plurality of bicell assemblies share a common first ion exchange membrane and a common second ion exchange membrane.

BRIEF DESCRIPTION OF THE DRAWINGS

FIG. 10 is a side view of the pivotable baffle subassembly shown in FIG. 9.

FIB. 11 is a schematic view of third embodiment of an electrochemical fuel cell assembly employing ambient air as the oxidant and coolant, which employs external dampers for adjusting the flow through the air conducting channels.

DETAILED DESCRIPTION OF THE PREFERRED EMBODIMENTS

Figure 1:
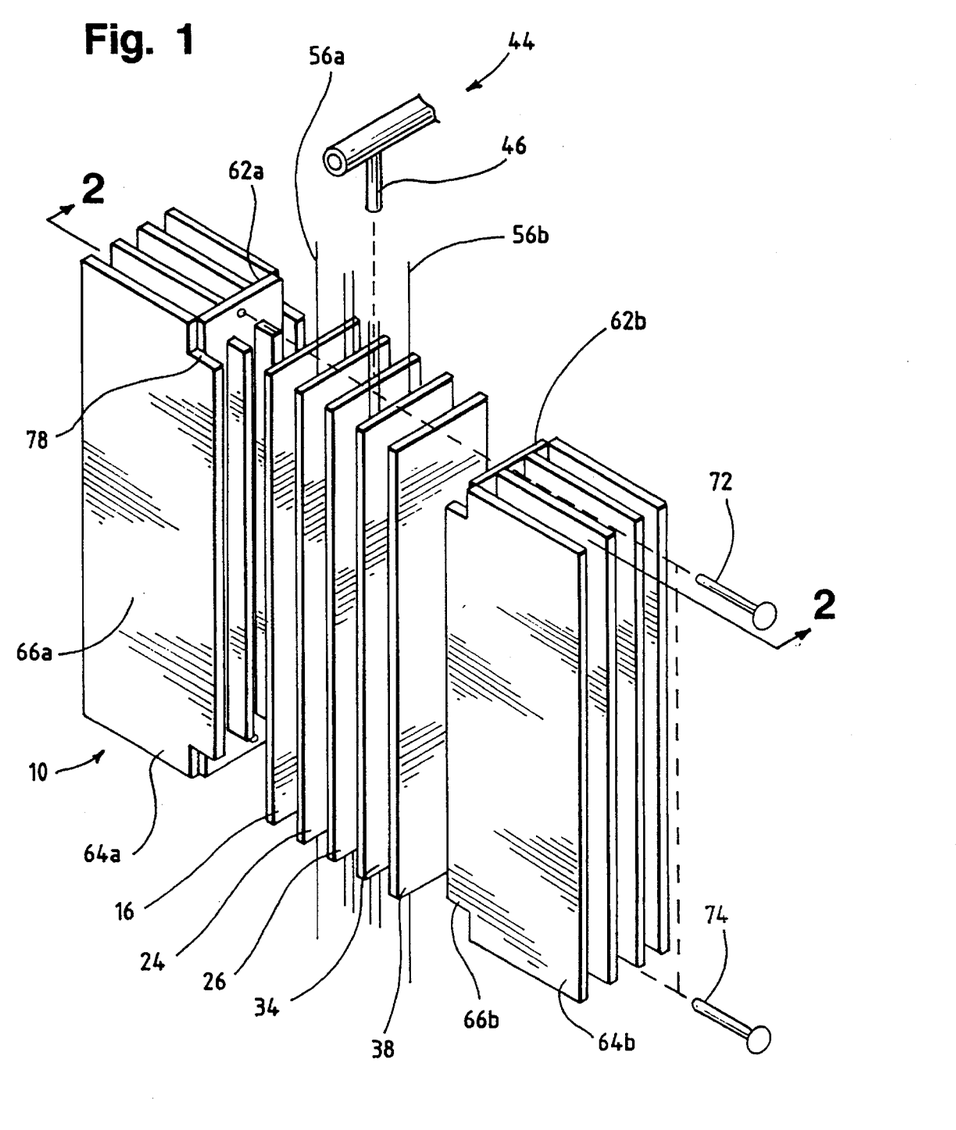
FIG. 1 is an exploded perspective view of an electrochemical fuel cell assembly employing ambient air as the oxidant and coolant.
Figure 2A:
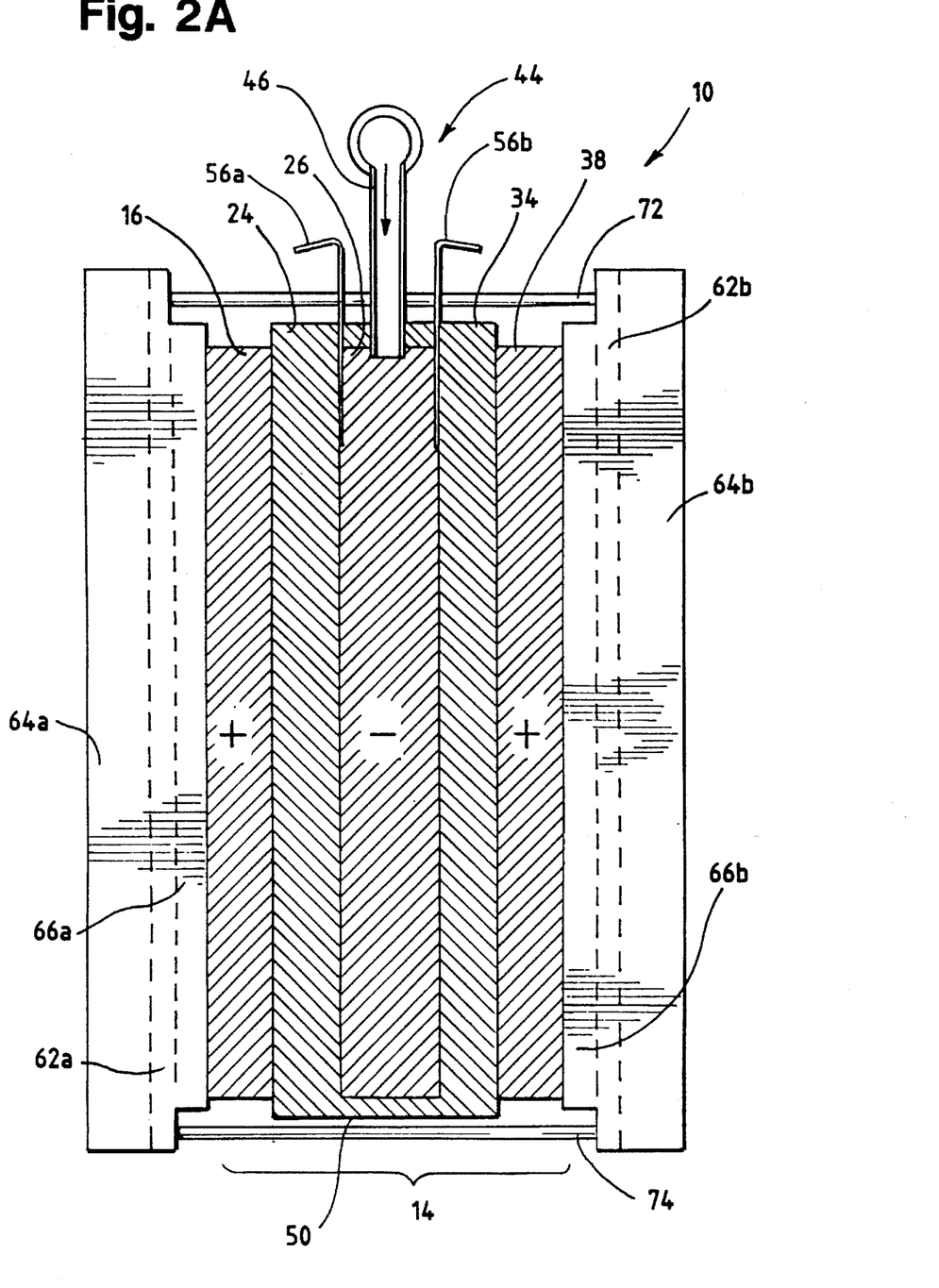
FIG. 2A is a section view taken in the direction of arrows 2—2 in FIG. 1.

Referring first to FIG. 1 and FIG. 2A, an electrochemical fuel cell assembly 10, includes a bicell membrane electrode assembly ("MEA") 14. Bicell MEA 14 includes a first cathode 16, an anode 26, and a second cathode 38. A first ion exchange membrane 24 is interposed between first cathode 16 and anode 26. A second ion exchange membrane 34 is interposed between second cathode 38 and anode 26. Fuel supply line 44 and fuel inlet 46 contain and direct fuel at a pressure slightly greater than atmospheric to anode 26.

The electrodes 16, 26, 38 are formed of porous electrically conductive sheet material, preferably porous carbon fiber paper ("CFP") impregnated or coated with a hydrophobic polymer, such as polytetrafluoroethylene. The electrodes 16, 26, 38 are each treated with a layer of catalyst, such as platinum or other suitable electrocatalytic material, on the surface(s) adjacent and in contact with the ion exchange membrane(s) 24, 34 to facilitate the desired chemical reaction. Suitable ion exchange membranes are commercially available from DuPont under the trade name Nafion 117 and from Dow under the trade designation XUS 13204.10.

The electrodes 16, 26, 38 and the ion exchange membranes 24, 34 are arranged together in an interleaved or sandwich-like manner, as illustrated in FIG. 1 and FIG. 2A, and placed in a high pressure press at a temperature sufficient to soften the ion exchange membrane material. The combination of pressure and temperature forces the softened membrane material at least partially into the CFP electrode material, bonding the individual layers to form a single unitary assembly. Presently, the bicell MEA 14 is formed by placing the layers of material in a press at a temperature and pressure sufficient to soften the material and create an intimate bond.

Low pressure can be employed to supply the gaseous fuel because the chemical reaction at the anode 26 consumes the fuel and draws it into the anode 26. The porous structure of the CFP used to form the anode 2G facilitates the delivery of the gaseous fuel throughout the anode 26. The gaseous fuel reacts at the anode 26 to produce cations (protons) and electrons. When hydrogen is used as the fuel, the reaction at the anode produces hydrogen cations and electrons according to the following equation:

$$H_2 \rightarrow 2H^+ + 2e^-$$

The reaction at the cathodes 16, 38 produces water according to the following equation:

$$\tfrac{1}{2}O_2 + 2H^+ + 2e^- \rightarrow H_2O.$$

The ion exchange membrane facilitates the migration of cations from the anode 26 to the cathodes 16, 38. In addition to conducting hydrogen cations, the ion exchange membranes 24, 34 isolate the gaseous fuel stream from the oxidant stream. This is particularly important when hydrogen is employed as a fuel source because of the reaction which occurs when hydrogen and oxygen are mixed and ignited or contacted with a catalyst.

Figure 2B:
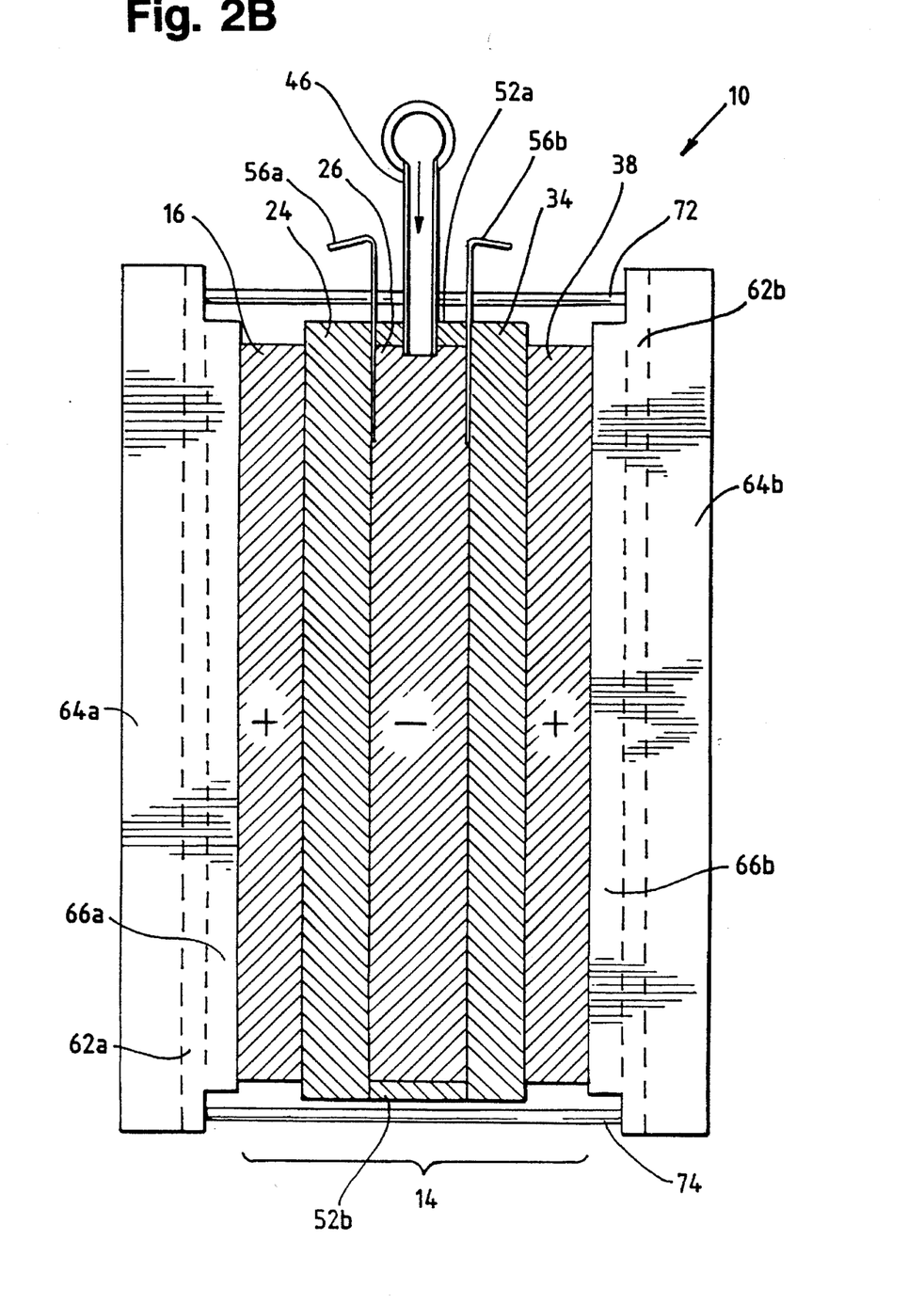
FIG. 2B is section view of an alternative embodiment of the electrochemical fuel cell assembly illustrated in FIGS. 1 and 2A.

A seal 50 provides a gas-impermeable barrier at the edges of the anode 26 to prevent leakage of the gaseous fuel from Within anode 26. In FIG. 2A, the seal 50 is formed by extending the ion exchange membranes 24, 34 over the edges of the anode 26. During the assembly process, the portions of the ion exchange membranes 24, 34 extending over the anode 26 can be adhered using heat and pressure to form a gas-impermeable seal around the anode 26. Alternatively, as illustrated in FIB. 2B, the seal 50 may be formed by disposing layers of sealant 52a, 52b, such as a silicon based sealant, along the top and bottom edge portions, respectively, of anode 26 which extend between the ion exchange membranes 24, 34.

As shown in FIGS. 1, 2A and 2B, edge current collectors 56a, 56b are disposed between the anode 26 and the ion exchange membranes 24, 34. The first edge current collector 56a is disposed between the anode 26 and the first ion exchange membrane 24, and the second edge current collector 56b is disposed between the anode 26 and the second ion exchange membrane 34. The edge current collectors 56a, 56b facilitate current flow (i.e., electron flow) from the anode 26 to an external load, as described in more detail below. As best shown in FIG. 2A, the edge current collectors 56a, 56b exit the bicell MEA 14 through the seal 50, thereby providing an electrical connection to the anode 26.

Each of the edge current collectors 56a, 56b is preferably formed from a plurality of electrically conductive wires (not shown). The wires forming the edge current collectors 56a, 56b are in turn preferably formed from a highly conductive material such as gold, niobium, platinum, titanium or graphite. Although a single wire can provide sufficient edge current collection, a plurality of wires is preferred. In FIG. 1, the conductive wires 56a, 56b are shown exiting from both the top and bottom of the bicell MEA 14, whereas in FIGS. 2A and 2B the conductive wires only exit from the top of the bicell MEA 14.

As shown in FIGS. 1, 2A and 2B, the fuel cell assembly 10 further includes first and second thermally conductive plates 62a, 62b disposed on opposite sides of the bicell MEA 14. The plates 62a, 62b are preferably constructed from aluminum which is either milled or extruded to form the illustrated configuration. Aluminum is preferred because it is relatively inexpensive and lightweight and because it has favorable thermal and electrical conductivity.

As shown in FIG. 1, each plate 62a, 62b includes a first set of thermally conductive members, shown in FIG. 1 as fins 66a, 66b, which extend toward the bicell MEA 14 and contact one of cathodes (cathode 38 in FIG. 1 and FIG. 2A) and a second set of thermally conductive members, shown in FIG. 1 as fins 64a, 64b, which extend away from the bicell MEA 14. The portion of each fin 66a, 66b which contacts the surface of a cathode is preferably plated with gold to prevent oxidization of the aluminum and ensure good electrical contact between the cathode 38 and each fin 66a, 66b.

The first set of thermally conductive members 66a, 66b provide structural rigidity and support for the bicell MEA 14, stabilize the MEA 14, and inhibit distortion of the MEA 14 from swelling due to oversaturation of the membrane.

Each of the second set of thermally conductive members, shown in FIG. 1 as fins 64a, 64b, could also be formed as a thermally conductive foam, in lieu of the fins. Thermally conductive foam has an irregular three-dimensional conformation, with interstitial spaces permitting the passage of air and other coolant fluids through the irregular, lattice-like structure of the thermally conductive material from which the foam if formed. The preferred thermally conductive foam is an aluminum foam.

As shown in FIG. 1, a fastener mechanism secures the plates 62a, 62b and MEA 14 in assembled form and maintains contact between the fins 66a, 66b and the exposed surfaces of cathodes 16, 38. The fastener mechanism preferably includes a first threaded fastener 72 extending through the upper portion of the plates 62a, 62b and a second threaded fastener 74 extending between the bottom portion of the plates 62a, 62b. The threaded fasteners 72, 74 connect the plates 62a, 62b and allow the plates 62a, 62b to be clamped against the bicell MEA 14, thereby maintaining electrical and physical contact between the cathodes 16, 38 and the plates 62a, 62b.

Both sets of fins 64a, 64b and 66a, 66b are open at the top and bottom to allow air flow through the fins. Heat produced by the exothermic chemical reaction of fuel (hydrogen) and oxidant (oxygen) within the bicell MEA 14 is dissipated to the atmosphere through the fins 64a, 64b and 66a, 66b. It has been found that such heat dissipation produces a natural convection current which causes the ambient air to be drawn upwardly through the fins 64a, 64b and 66a, 66b. The set of fins 64a extend in a direction away from MEA 14, and function primarily as heat transfer surfaces for expelling waste heat to the atmosphere such that a desired operation temperature of the bicell MEA 14 is maintained. The sets of fins 66a, 66b, in addition to functioning as heat transfer surfaces, cooperate with the plates 62a, 62b and the adjacent cathodes to form a plurality of air conducting channels which draw oxygen-containing ambient air toward the exposed surface of the cathodes. For example, fins 66a cooperate with plate 62a and cathode 16 to form an air conducting channel 78 (see FIG. 1). A similar plurality of air conducting channels draws oxygen-containing ambient air toward the exposed surface of cathode 38. The vertical orientation of the air supply channels 78 allows the water produced at the cathode 16 to flow downwardly toward the bottom of the fuel cell assembly 10 where it can be drained from the assembly, thereby preventing oversaturation of the ion exchange membrane 24.

In employing ambient air as the oxidant and coolant for the fuel cell assembly 10, the following operating conditions should be present:

(1) ambient air flow through the air conducting channels to provide a sufficient stoichiometric supply of reactant oxygen to support the reaction at the membrane electrode assembly;

(2) ambient air flow and operating temperature should be such that the water removal capacity of the ambient air flow is less than the rate of production of reactant water to prevent dehydration of the ion exchange membranes;

(3) the operating temperature of the cell should be high enough to provide reasonable fuel cell performance; and (4) the operating temperature of the fuel cell should be high enough to allow the cell to reject waste heat to the atmosphere by natural convection.

With these considerations in mind, the size, spacing, and number of members or fins is empirically optimized to provide temperature stability and performance stability over a wide range of loads.

Figure 3:
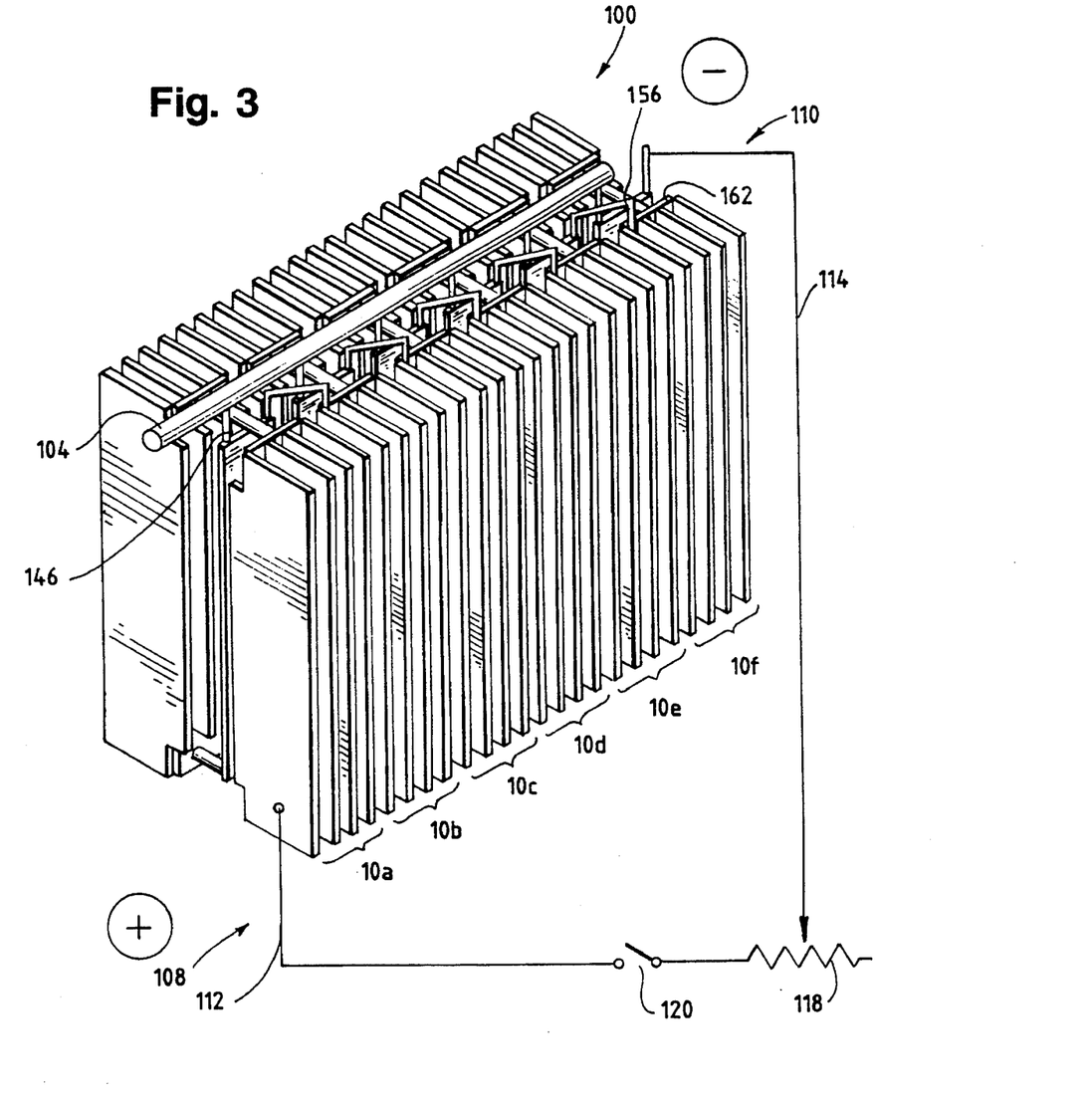
FIG. 3 is a perspective view of a fuel cell stack connected across an external load.

Turning now to FIG. 3, a plurality of the fuel cell assemblies, six of which are designated in FIG. 3 as assemblies 10a, 10b, 10c, 10d, 1De, and 10f, can be combined to form a fuel cell stack 100. Fuel inlets, one of which is designated in FIG. 3 as fuel inlet 146, each direct a fuel stream to one of the respective fuel cell assemblies 10a–f. The fuel inlets are connected to a main fuel supply line 104, which is in turn connected to a fuel supply source (not shown) for delivering gaseous fuel at a pressure slightly greater than atmospheric to the stack 100.

In FIG. 3, the fuel cells assemblies 10a–f are electrically connected in series so that the fuel cell stack 100 produces a voltage potential equal to the sum of the voltages of the individual fuel cell assemblies 10a–f. More specifically, the edge current collectors 156 are used to electrically couple the anode of one bicell MEA to the cathodes of the next adjacent bicell MEA in the stack 100. For example, in FIG. 3 the anode of the first fuel cell assembly 10a is electrically connected to the cathodes of the second fuel cell assembly 10b. This electrical connection is preferably made by connecting the edge current collectors 156 from one fuel cell assembly to the plate 162 adjacent the next fuel cell assembly in the stack 100.

The full electrical potential of the stack 100 is imposed between a positive lead 108 and a negative lead 110. The positive lead 108 is formed by connecting an electrical conductor 112 to a positively charged portion of the first cell 10a in the stack 100. Specifically, the positive lead 108 can be connected to either of the end plates, the fins, the threaded fasteners, or the cathodes of the first cell 10a. The negative lead 110 is formed by joining the edge current collectors of the last fuel cell assembly 10f to form a single conductor 114.

As is illustrated schematically in FIB. 3, when the stack 100 is installed in an electrical circuit, a load 118 and a contactor switch 120 can be connected between the positive and negative leads 108, 110. The contactor switch 120 can be selectively opened and closed to deliver power from the stack 100 to the load 118.

Figure 4A:
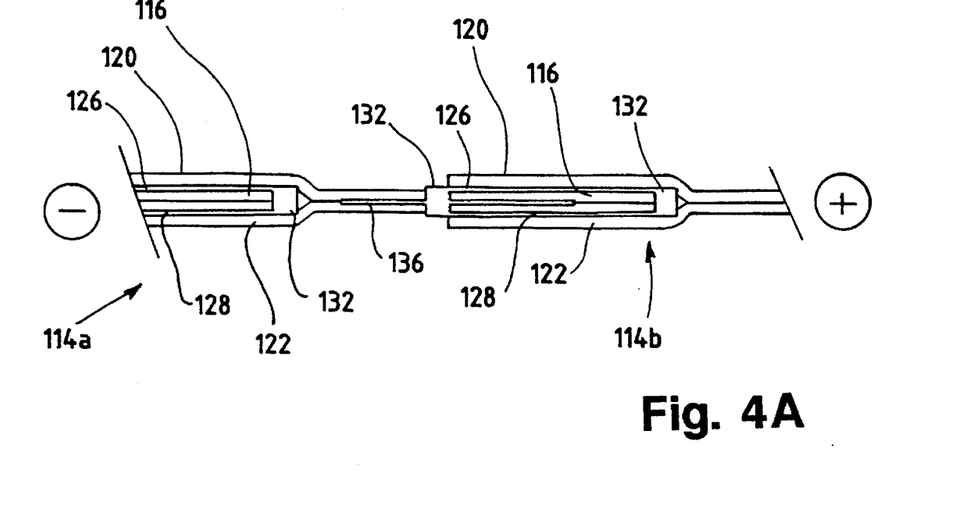
FIGS. 4A and 4B illustrate alternative embodiments of an interleaved membrane electrode assembly according to the present invention.
Figure 4B:
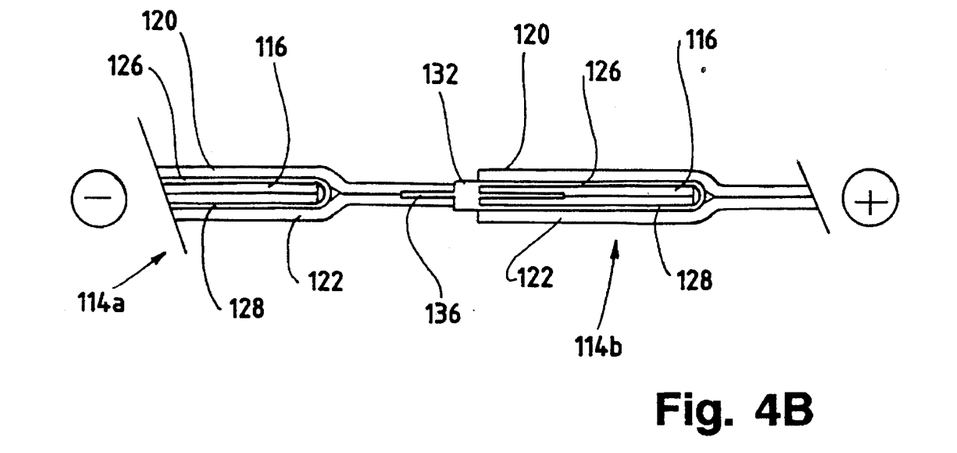

FIBS. 4A and 4B illustrate alternative embodiments for serially connecting individual bicell MEAs to form a stack configuration. In both FIGS. 4A and 4B, the electrodes of successive bicell MEAs are interleaved to form serial electrical connections. Each bicell MEA 114 includes a center anode 116 interposed between two cathodes 120, 122. Two sheets of solid polymer ion exchange membranes 126, 128 are interposed between the anode 116 and the cathodes 120, 122. In FIG. 4A, sealant material 132 is disposed at both ends of the anode 116 to prevent leakage of the gaseous fuel supplied to the anode 116. In FIG. 4B, a single sheet of material is used to form ion exchange membranes 126, 128. The membrane material is looped around one end of the anode 116 and sealant material 132 is used to seal the other end of the anode 116.

In both embodiments illustrated in FIGS. 4A and 4B, the cathodes 120, 122 extend beyond one end of a respective anode 116 and are joined around an electrical conductor 136. The electrical conductor 136 in turn extends through the sealant 132 and into the anode 116 of the next bicell MEA 114b in the stack.

Figure 5:
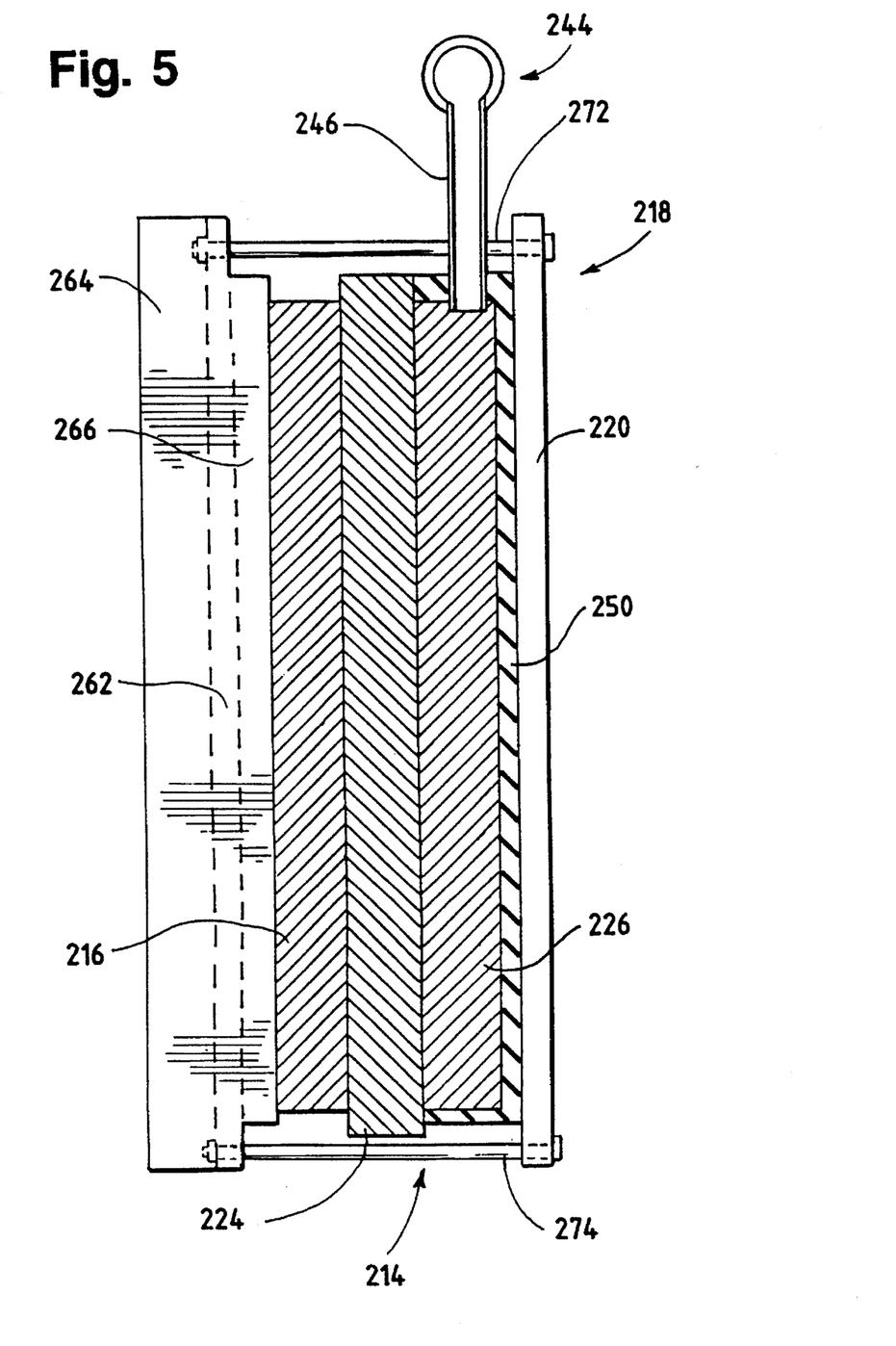
FIG. 5 is a side sectional view of an alternative embodiment of an electrochemical fuel cell assembly employing ambient air as the oxidant and coolant.

FIB. 5 illustrates an alternative embodiment of a fuel cell assembly which employs ambient air as the oxidant and coolant. In FIG. 5, a unicell MEA 214 is employed as opposed to the bicell MEA arrangement of FIGS. 1, 2A and 2B. MEA 214 includes an ion exchange membrane 224, which is interposed between anode 226 and cathode 216. A seal 250, formed of sealant material disposed along the exterior surfaces of the anode 226, is also shown in FIG. 5. Seal 250 forms a gas-impermeable barrier to prevent leakage of gaseous fuel supplied to the anode 226. A fuel delivery mechanism 244 delivers gaseous fuel (preferably substantially pure hydrogen) to the anode 226 of the unicell MEA 214. The fuel delivery means 244 includes at least one fuel inlet 246 which extends partially into the anode 226. The fuel inlet 246 delivers gaseous fuel to the anode 226 at a low pressure or at slightly greater than atmospheric pressure.

In the embodiment illustrated in FIG. 5, a clamping mechanism 218 secures the plate 262, together with its fins 264, 266, against the cathode 216 of the unicell MEA 214. The clamping means 218 is illustrated in FIG. 5 as a pair of threaded fasteners 272, 274 and an end plate 220.

Figure 6:
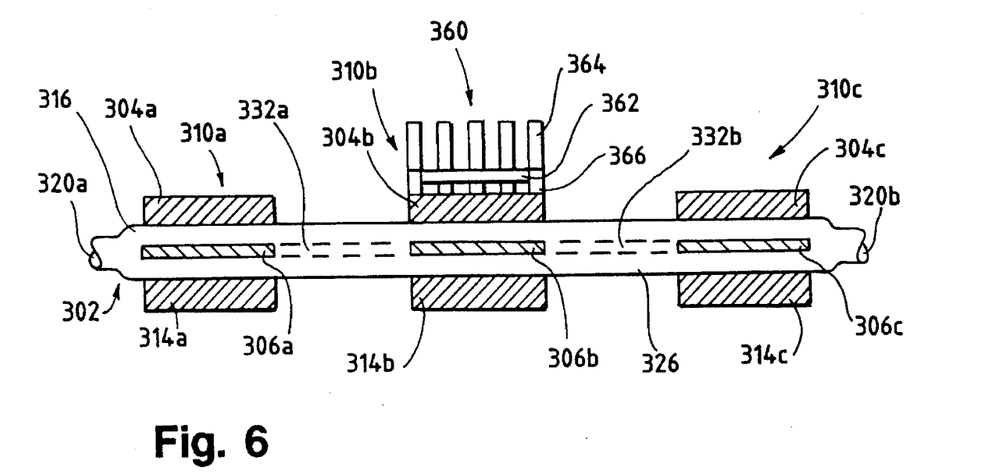
FIG. 6 is a sectional view of a multiplexed arrangement of three bicell membrane electrode assemblies employing ambient air as the oxidant and coolant, which share common ion exchange membranes.

FIG. 6 shows a multiplexed arrangement 302 of three bicell assemblies employing ambient air as the oxidant and coolant. The multiplexed arrangement includes first cathodes 304a, 304b, 304c, anodes 306a, 306b, 306c, and second cathodes 314a, 314b, 314c. As shown in FIG. 6, first cathode 304a, anode 306a and second cathode 314a are arranged in a first bicell MEA 310a, with first ion exchange membrane 316 interposed between first anode 306a and cathode 304a, and second ion exchange membrane 326 interposed between anode 306a and second cathode 314a. Similarly, first cathode 304b, anode 306b and second cathode 314b are arranged in a second bicell MEA 310b, with first ion exchange membrane 316 interposed between first anode 306b and cathode 304b, and second ion exchange membrane 326 interposed between anode 306b and second cathode. 314b. Finally, first cathode 304c, anode 306c and second cathode 314c are arranged in a third bicell MEA 310c, with first ion exchange membrane 316 interposed between first anode 306c and cathode 304c, and second ion exchange membrane 326 interposed between anode 306c and second cathode 314c. As shown in FIG. 6, first, second and third bicell assemblies 310a, 310b, 310c share a common first ion exchange membrane 316 and a common second ion exchange membrane 326. FIG. 6 also shows the location of one of the thermally conductive member or fin subassemblies 360. Fin subassembly 360 includes a thermally conductive plate 362, a first set of thermally conductive members or fins 366, which extend toward bicell MEA 310b and contact cathode 304b, and a second set of thermally conductive members or fins 364, which extend away from bicell MEA 310b. Channels 332a and 332b are the fuel flow channels which interconnect the anodes in the multiplexed arrangement 302 shown in FIG. 6. Multiplexed arrangement 302 is sealed on both ends by seals 320a, 320b, preferably formed by the fusing together of first and second ion exchange membranes 316, 326.

Figure 7:
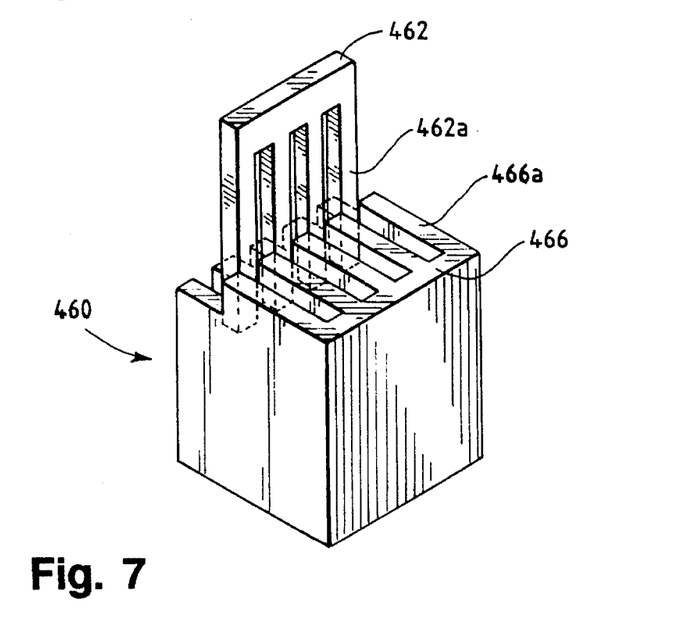
FIG. 7 is an exploded perspective view of a first embodiment of a thermally conductive member or fin subassembly for an electrochemical fuel cell assembly employing ambient air as the oxidant and coolant, which employs a slidable comb for adjusting the configuration of the air conducting channels.

FIG. 7 shows a thermally conductive member or fin subassembly 460 which employs a slidable comb 462 for adjusting the configuration of the air conducting channels. The air conducting channels are formed by the spaces between the fins, one of which is designated in FIG. 7 as fin 466a. As shown in FIG. 7, slidable comb 462 includes a plurality of tines 462a, which extend into the channels formed by the spaces between the fins.

Figures 8, 9:
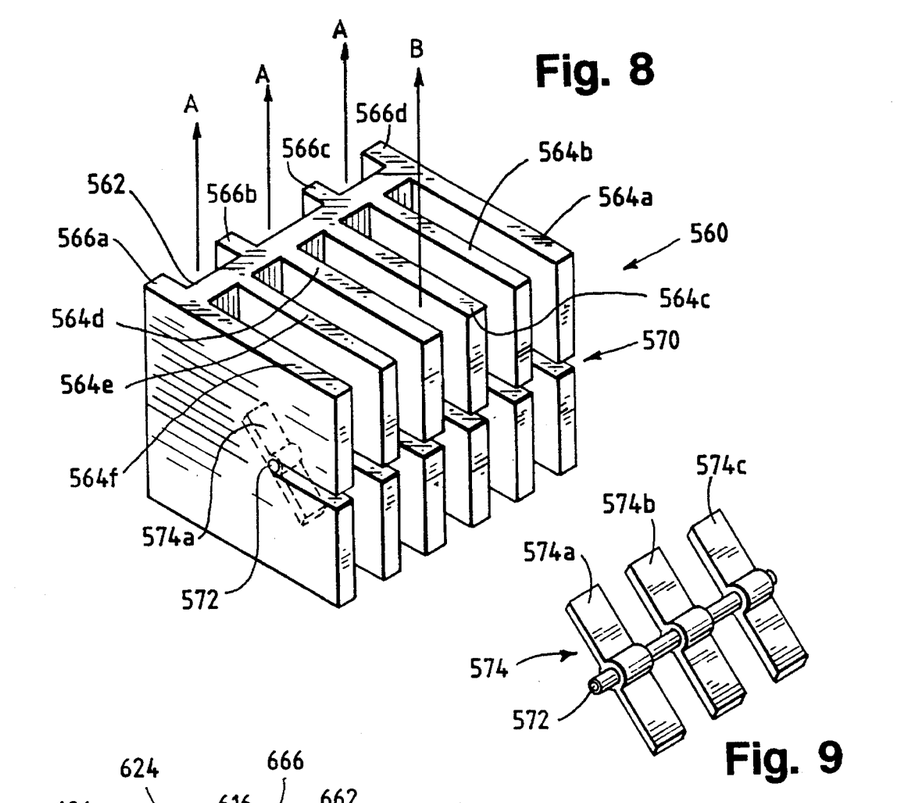
FIG. 8 is a perspective view of second embodiment of a thermally conductive member or fin subassembly for an electrochemical fuel cell assembly employing ambient air as the oxidant and coolant, which employs a pivotable baffle (shown in phantom lines) for adjusting the flow through the air conducting channels.
FIG. 9 is a perspective view of a pivotable baffle subassembly for use in conjunction with the fin subassembly shown in FIG. 8.

FIG. 8 shows another fin subassembly 560 which employs pivotable baffles (one of which is shown in phantom lines in FIG. 8 as baffle 574a). Fin subassembly 560 includes a thermally conductive plate 562. A plurality of thermally conductive fins 566a, 566b, 566c, 566d extend from one major surface of plate 562. In the completed fuel cell assembly incorporating fin subassembly 560, fins 566a–d contact the outwardly facing surface of the adjacent cathode (not shown in FIG. 8). A plurality of thermally conductive fins 564a, 564b, 564c, 564d, 564e, 564f extend from the other major surface of plate 562. Each of fins 564a–f has a slotted opening formed therein, one of which is shown in FIG. 8 as slot 570. A pivotable baffle subassembly, one baffle of which is shown in FIG. 8 as baffle 574a, is suspended in the slots by pivot pin 572. Rotation of baffle 574a about pivot pin 572 regulates the amount of air flow through the air conducting channels.

Arrows A in FIG. 8 show the direction of air flow through the channels formed between fins 566a–d, and represent the air supply for the electrochemical reaction at the adjacent cathode (not shown). Arrow B in FIG. 8 shows the direction of air flow through the channels formed between fins 564a–f, and represents the air supply for conducting heat from the adjacent fuel cell structure (not shown), thereby providing thermal management to the adjacent fuel cell structure.

Figures 10, 11:
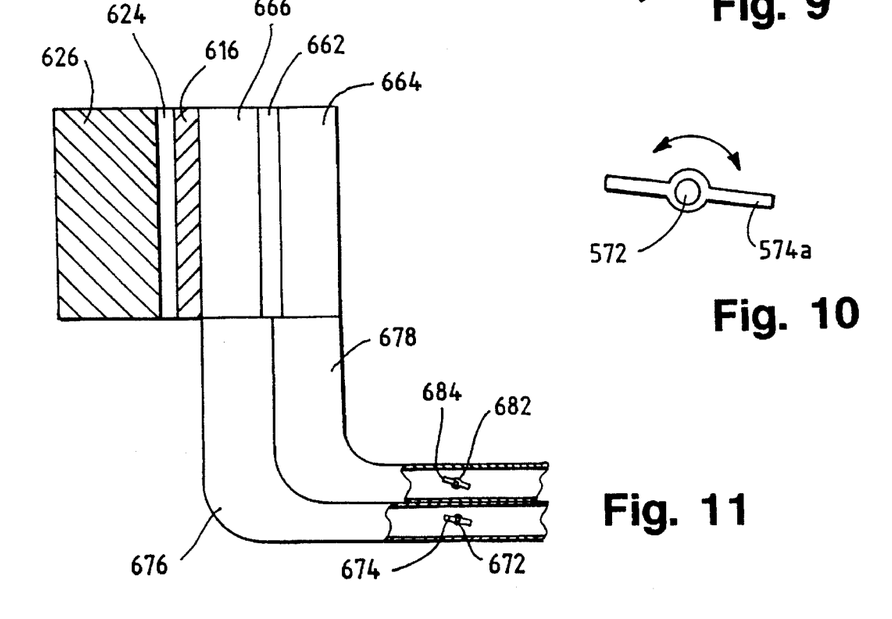

FIG. 9 shows pivotable baffle subassembly 574 for use in conjunction with the fin subassembly 560 in FIG. 8. Subassembly 574 includes a plurality of baffles 574a, 574b, 574c mounted on central pivot pin 572. FIG. 10 shows a side view of pivotable baffle subassembly 574.

FIG. 11 shows schematically an electrochemical fuel cell assembly employing ambient air as the oxidant and coolant, which employs external dampers 676, 678 having pivotable baffles 674, 684, respectively, for adjusting the flow through the air conducting channels 664, 666. In FIG. 11, anode 626, ion exchange membrane 624 and cathode 616 form the membrane electrode assembly. Fins (not shown) extend from each major surface of plate 662. The spaces formed between the extending fins form air conducting channels 664, 666. Dampers 676, 678 include baffles 674, 684, which are mounted on pivot pins 672, 682, respectively. Rotation of baffle 674, 684 about the respective pivot pins 672, 682 regulates the amount of air flow through the air conducting channels 664, 666.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electrochemical fuel cell assembly comprising:
    a membrane electrode assembly comprising a porous electrically conductive anode, a porous electrically conductive cathode having a surface thereof exposed to ambient air, and an ion exchange membrane interposed between said anode and said cathode;
    sealant means for forming a gas-impermeable barrier around said anode;
    fuel delivery means for supplying a gaseous fuel stream to said anode;
    electrical connection means for providing an electrical connection to said anode and to said cathode;
    a thermally conductive plate having a plurality of first thermally conductive members extending from a major surface thereof, said first members contacting portions of said exposed cathode surface, adjacent ones of said first members cooperating with said plate and said exposed cathode surface to form at least one air conducting channel;
    whereby at least a portion of the heat generated exothermically in said membrane electrode assembly is dissipated to the atmosphere through said first members.

2. The electrochemical fuel cell of claim 1, wherein said plate is formed as a single planar piece.

3. The electrochemical fuel cell of claim 1, wherein said plate and said first members are formed of aluminum, the portions of said first members contacting said cathode surface having an inert metal applied thereto.

4. The electrochemical fuel cell of claim 3, wherein said inert metal is gold.

5. The electrochemical fuel cell assembly of claim 1, wherein said electrical connection means comprises electrical conductors disposed between said anode and said ion exchange membrane, said electrical conductors extending through said sealing means.

6. The electrochemical fuel cell of claim 5, wherein said electrical conductors are formed from gold wire.

7. The electrochemical fuel cell assembly of claim 1, wherein said plate has a thermally conductive material extending from another major surface thereof, whereby heat generated exothermically in said membrane electrode assembly is further dissipated to the atmosphere through said material.

8. The electrochemical fuel cell assembly of claim 7, wherein said material comprises a plurality of thermally conductive members.

9. The electrochemical fuel cell assembly of claim 7, wherein said material comprises a thermally conductive foam.

10. The electrochemical fuel cell assembly of claim 9, wherein said thermally conductive foam is an aluminum foam.

11. The electrochemical fuel cell assembly of claim 1, wherein said fuel delivery means comprises a fuel inlet and a fuel outlet, said fuel outlet directing unreacted components of said gaseous fuel stream away from said anode.

12. The electrochemical fuel cell assembly of claim 1, further comprising a fan for directing said ambient air onto the exposed surface of said porous electrically conductive cathode.

13. The electrochemical fuel cell assembly of claim 1, wherein said gaseous fuel stream comprises hydrogen, said assembly further comprising means for accumulating water condensed on said first members.

14. A fuel cell stack comprising:
    a plurality of fuel cell assemblies as defined in claim 1;
    serial connection means for electrically connecting said plurality of fuel cell assemblies in an electrical series having a first assembly and a last assembly, wherein the anode of each assembly except the last assembly in said series is electrically connected to the cathode of the next adjacent assembly in said series;
    a positive current lead electrically connected to the cathode of said first assembly in said series; and
    a negative current lead electrically connected to the anode of the last assembly in said series.

15. The fuel cell stack of claim 14, wherein said plurality of fuel cell assemblies share a common ion exchange membrane.

16. An electrochemical fuel cell assembly comprising:
    a bicell membrane electrode assembly comprising a first porous electrically conductive cathode having a surface thereof exposed to ambient air, a porous electrically conductive anode, a second porous electrically conductive cathode having a surface thereof exposed to ambient air, a first ion exchange membrane interposed between said first cathode and said anode, and a second ion exchange membrane interposed between said second cathode and said anode;
    sealing means for forming a gas-impermeable barrier around said anode;
    fuel delivery means for delivering gaseous fuel to said anode;
    electrical connection means for providing an electrical connection to said anode, to said cathode, and to said second cathode;

a first thermally conductive plate having a plurality of first thermally conductive members extending from a major surface thereof, said first members contacting portions of said exposed first cathode surface, adjacent ones of said first members cooperating with said first plate and said exposed first cathode surface to form at least one air conducting channel;

a second thermally conductive plate having a plurality of second thermally conductive members extending from a major surface thereof, said second members contacting portions of said exposed second cathode surface, adjacent ones of said second members cooperating with said second plate and said exposed second cathode surface to form at least one air conducting channel;

whereby at least a portion of the heat generated exothermically in said membrane electrode assembly is dissipated to the atmosphere through said first and second members.

17. The electrochemical fuel cell of claim 16, wherein said plate and said first and second members are formed of aluminum, the portions of said first and second members contacting said cathode surface having an inert metal applied thereto.

18. The electrochemical fuel cell of claim 17, wherein said inert metal is gold.

19. The electrochemical fuel cell assembly of claim 16, wherein said electrical connection means comprises first electrical conductors disposed between said anode and said first membrane, and second electrical conductors disposed between said anode and said second membrane, said first and second electrical conductors extending through said sealing means.

20. The electrochemical fuel cell of claim 19, wherein said first and second electrical conductors are formed from gold wire.

21. The electrochemical fuel cell assembly of claim 16, wherein said first plate has a first thermally conductive material extending from another major surface thereof and wherein said second plate has a second thermally conductive material extending from another major surface thereof, whereby heat generated exothermically in said membrane electrode assembly is further dissipated to the atmosphere through said first and second material.

22. The electrochemical fuel cell assembly of claim 21, wherein said first and second material each comprises a plurality of thermally conductive members.

23. The electrochemical fuel cell assembly of claim 21, wherein said material comprises a thermally conductive foam.

24. The electrochemical fuel cell assembly of claim 23, wherein said thermally conductive foam is an aluminum foam.

25. The fuel cell assembly as in claim 16, wherein said sealing means comprises said first and second membranes, the edges of the first and second membranes bonded together to form a gas-impermeable barrier around said anode.

26. The electrochemical fuel cell assembly of claim 16, wherein said fuel delivery means comprises a fuel inlet and a fuel outlet, said fuel outlet directing unreacted components of said gaseous fuel stream away from said anode.

27. The electrochemical fuel cell assembly of claim 16, further comprising a fan for directing said ambient air onto the exposed surface of said porous electrically conductive cathode.

28. The electrochemical fuel cell assembly of claim 16, wherein said gaseous fuel stream comprises hydrogen, said assembly further comprising means for accumulating water condensed on said first members.

29. A fuel cell stack comprising:

a plurality of fuel cell assemblies as defined in claim 16;

serial connection means for electrically connecting said plurality of fuel cell assemblies in an electrical series having a first assembly and a last assembly, wherein the anode of each assembly except the last assembly in said series is electrically connected to the cathodes of the next adjacent assembly in said series;

a positive current lead electrically connected to the cathodes of said first assembly in said series; and a negative current lead electrically connected to the anode of the last assembly in said series.

30. The fuel cell stack of claim 29, wherein said plurality of fuel cell assemblies share a common first ion exchange membrane and a common second ion exchange membrane.

* * * * *